United States Patent [19]

Chattha

[11] 4,233,415
[45] Nov. 11, 1980

[54] COATING COMPOSITION CATALYZED WITH PHOSPHONIC ACID DERIVATIVE-#2

[75] Inventor: Mohinder S. Chattha, Livonia, Mich.

[73] Assignee: Ford Motor Company, Dearborn, Mich.

[21] Appl. No.: 93,430

[22] Filed: Nov. 13, 1979

[51] Int. Cl.³ ............................................. C08L 37/00
[52] U.S. Cl. ............................ 525/161; 260/42.22; 260/42.28; 428/458; 428/463; 525/162; 525/913
[58] Field of Search ................................ 525/161, 162

[56] References Cited
U.S. PATENT DOCUMENTS

| | | | |
|---|---|---|---|
| 2,528,359 | 10/1950 | Greenlee | 260/834 |
| 2,528,360 | 10/1950 | Greenlee | 260/834 |
| 2,541,027 | 2/1951 | Bradley | 260/834 |
| 2,732,367 | 1/1956 | Shokal | 260/834 |
| 2,849,418 | 8/1958 | Fang | 260/836 |
| 3,133,838 | 5/1964 | Higgins | 260/837 |
| 3,198,850 | 8/1965 | Levantin | 260/837 |
| 3,201,374 | 8/1965 | Simms | 260/854 |
| 3,532,655 | 10/1970 | Radlove | 260/854 |
| 3,651,169 | 3/1972 | Davis | 260/834 |
| 3,773,710 | 11/1973 | Victorius | 260/856 |
| 3,790,513 | 2/1974 | Victorius | 260/856 |
| 3,846,368 | 11/1974 | Pettit | 260/856 |
| 3,865,904 | 2/1975 | Wingler | 260/901 |
| 3,959,554 | 5/1976 | Hick | 428/336 |
| 3,960,979 | 6/1976 | Khanna | 260/834 |
| 4,002,699 | 1/1977 | Labana | 260/851 |
| 4,018,848 | 4/1977 | Khanna | 260/834 |
| 4,027,066 | 5/1977 | Victorius | 260/834 |
| 4,055,607 | 10/1977 | Sullivan | 260/834 |
| 4,181,783 | 1/1980 | Chattha | 525/161 |
| 4,181,784 | 1/1980 | Chattha et al. | 525/161 |
| 4,181,785 | 1/1980 | Chattha et al. | 525/161 |
| 4,184,025 | 1/1980 | Chattha | 525/161 |

Primary Examiner—Paul Lieberman
Attorney, Agent, or Firm—Roger L. May; Olin B. Johnson

[57] ABSTRACT

A fast curing, coating composition that is adapted for use as an auotmotive topcoat and which upon curing forms a hard, glossy, durable coating exhibiting excellent resistance to solvents and water. The coating composition which may contain greater than about 55 percent by weight of nonvolatile solids and, exclusive of pigments, solvents and other nonreactive components, consists essentially of:

(A) a bifunctional copolymer bearing hydroxy functionality and pendent epoxy functionality, having a number average molecular weight ($M_n$) of between about 1500 and about 10,000 and a glass transition temperature (Tg of between about $-25°$ and about 70°;

(B) a reactive catalyst comprising at least one phosphonic acid derivative;

(C) an amine-aldehyde resin crosslinking agent; and (D) optionally, a hydroxy functional additive.

The phosphonic acid derivative catalyst is included in the composition in an amount sufficient to provide between about 0.8 and about 1.4 equivalents of acid functionality in copolymer (A), and the amine-aldehye resin crosslinking agent is included in the composition in an amount sufficient to provide at least about 0.4 equivalents of nitrogen crosslinking functionality for each equivalent of hydroxy functionality included in the composition.

16 Claims, No Drawings

COATING COMPOSITION CATALYZED WITH PHOSPHONIC ACID DERIVATIVE-#2

BACKGROUND OF THE INVENTION

This invention relates to a fast curing, thermosetting coating composition. More particularly, the invention relates to polymeric, high solids, fast curing coating compositions adapted to provide an automotive topcoat which demonstrates hardness, high gloss, outstanding durability and excellent resistance to solvents and water. Still more particularly, this invention relates to fast curing, high solids, thermosetting coating compositions adapted to be used as an automotive topcoat wherein the topcoat includes metallic flake as a pigment.

Because of increasingly strict solvent emissions regulations in recent years, low solvent emission paints have become very desirable. A number of high solids paint compositions have been proposed to meet these low solvent emission requirements. However, many of these compositions are deficient because of difficulty in application, slow curing rates, lack of flexibility, poor durability, and low solvent and water resistance. Many of the proposed compositions have been particularly deficient as automotive topcoats, particularly when the topcoat is to include metallic flake as a pigment.

The deficiency in compositions including metallic flake results from undesired reorientation of the metallic flake during application and curing of the coating. The flake reorientation results primarily because of the very low viscosity resins used in the paint compositions to accommodate high solids. The low viscosity is not sufficient to immobilize the flakes which tend to redistribute themselves to show "reverse flop" and nonuniform distribution.

The coating compositions of this invention combine the above discussed desired properties and low application viscosity with rapid cure so as to overcome dificiencies of previously proposed high solids materials and thereby achieve a high solids coating composition particularly adapted for automotive topcoats including metallic flake as a pigment.

SUMMARY OF THE INVENTION

The thermosetting coating composition of this invention may contain greater than about 55 percent by weight of nonvolatile solids, preferably greater than about 70 percent by weight, and is capable of curing rapidly at a low temperature. The composition, exclusive of pigments, solvents and other nonreactive components, consists essentially of:

(A) a bifunctional copolymer bearing hydroxy functionality and pendent epoxy functionality, having a number average molecular weight ($\overline{M}_n$) of between about 1500 and about 10,000 and a glass transition temperature (Tg) of between about $-25°$ and about $70°$ C., the copolymer consisting of (i) between about 5 and about 25 weight percent of monoethylenically unsaturated monomers bearing glycidyl functionality and between about 5 and about 25 weight percent of monoethylenically unsaturated monomers bearing hydroxy functionality, with the total of the monoethylenically unsaturated monomers bearing either said glycidyl functionality or said hydroxy functionality being not greater than about 30 weight percent of the monomers in the bifunctional copolymer, and (ii) between about 90 and about 70 weight percent of other monoethylenically unsaturated monomers;

(B) a reactive catalyst comprising at least one phosphonic acid derivative having the formula:

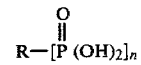

wherein n=1 to 2 and R is selected from the group consisting of alkyl, cycloalkyl or aryl radicals;

(C) an amino resin crosslinking agent; and (D) up to about 45 weight percent based on the total weight of
  (A), (B), (C) and (D) of a hydroxy functional resin having
  a number average molecular weight ($\overline{M}_n$) of between about 150 and about 6000.

The phosphonic acid derivative is included in the composition in an amount sufficient to provide between about 18 and about 1.4 equivalents, preferably between about 0.9 and about 1.1 equivalents, of acid functionality for each equivalent of pendent epoxy functionality on the bifunctional copolymer. The amino resin crosslinking agent is included in the composition in an amount sufficient to provide at least about 0.4 equivalents, preferably between about 0.6 and about 2.1 equivalents, of nitrogen crosslinking functionality for each equivalent of hydroxy functionality included in the composition either as (i) an organic hydroxyl group on the phosphonic acid derivative catalyst, (ii) a hydroxyl group on said bifunctional copolymer, (iii) a hydroxyl group on said hydroxy functional resin, or (iv) as a result of eterification of the pendent epoxy functionality of said bifunctional copolymer during cure of the composition. In addition, the high solids coating composition of the invention may include additives such as catalysts, antioxidants, U.V. absorbers, flow control or wetting agents, antistatic agents, pigments, plasticizers, solvents, etc.

PRIOR ART

U.S. Pat. Nos. 3,960,979 and 4,018,848 to Khanna teach high solids coating compositions adapted for use as a can coating material. The compositions consist essentially of (i) aromatic epoxide compositions having two or more epoxy groups on an epoxy resin which has a molecular weight not exceeding 2500; (ii) an amino crosslinking agent; (iii) an inorganic or organic monomeric or polymeric acid which acts as a reactive catalyst; and (iv) a flexiblizing polyol.

The compositions of Khanna have the advantage of quick reaction and low application viscosity, but lack durability and, therefore, do not weather well. This is, in part, because of the presence of ether linkages in the aromatic epoxides. As such, the compositions of Khanna are not desirable for use as automotive topcoats. The Khanna patents describe the compositions as a low cure system. However, when considering the specific teachings of the patents one finds that the composition includes an excess of epoxide resin apparently with the purpose of "killing off" excess catalyst after completion of the curing reaction. Excess epoxy resin in the composition remains uncured at the low temperature bake range of the baking temperatures disclosed, not giving a complete cure and desirable hardness, durability or solvent resistance. If heated to higher temperatures, as called for in the examples, the excess epoxy does react with excess hydroxy functionality to give still further ether linkages. These ether linkages so obtained have a further deleterious effect on durability and make the materials particularly unsuitable for use and an automotive topcoat. Also, the necessary high bake temperatures to achieve the utilization of this excess epoxy makes the composition undesirable from an energy point of view because of the high baking temperatures required. Still further, because the epoxy/catalyst reaction occurs in early stages of the cure, thus "killing off" the catalyst, the melamine hydroxy curing reaction must proceed substantially without benefit of catalysis. The curing reaction thus proceeds slowly and requires the higher temperatures of the Khanna examples.

DETAILED DESCRIPTION OF THE INVENTION

The coating compositions of this invention overcome disadvantages of prior art high solids compositions, including those of Khanna, to provide a system which is particularly suitable for those applications requiring high gloss, hardness, durability, and high solvent and water resistance as well as a fast cure rate at low temperatures, e.g., between about 75° C. and about 150° C., preferably between about 110° C. and about 130° C. The desirable characteristics of the coating compositions of this invention results from the carefully controlled admixture of the particular components, including a phosphonic acid derivative reactive catalyst, to achieve substantially complete utilization of reactant functionality and a resultant highly crosslinked coating in a fast and efficient manner.

Each of the components of the coating compositions, the amounts of each of the components required to achieve the desired results of the invention and a method for applying the composition are described hereinafter in greater detail.

Bifunctional Copolymer

A principal material in the coating compositions of this invention is a bifunctional copolymer bearing both hydroxy functionality and pendent epoxy functionality and which may be prepared by conventional free radical induced polymerization of suitable unsaturated monomers. The term "copolymer" as used herein means a copolymer of two or more different monomers.

The copolymers used in the coating compositions of this invention have a number average molecular weight ($M_n$) of between about 1500 and about 10,000, preferably between about 2,000 and about 6,000 and a glass transition temperature (Tg) of between about $-25°$ C. and about 70° C., preferably between about $-10°$ C. and about 50° C. The monomers used to prepare the copolymer include between about 5 and about 25 weight percent of one or more monoethylenically unsaturated monomers bearing glycidyl functionality and between about 5 and about 25 weight percent of one or more monoethylenically unsaturated monomers bearing hydroxy functionality, with the total of the monoethylenically unsaturated monomers bearing either epoxy or hydroxy functionality being not greater than about 30 weight percent of the monomers in the copolymer. The monoethylenically unsaturated monomers bearing glycidyl functionality may be either glycidyl ethers or glycidyl esters. Preferably, however, the epoxy functional monomers are glycidyl esters of monoethylenically unsaturated carboxylic acids. Examples are glycidyl acrylates and glycidyl methacrylates. These monomers provide the bifunctional copolymer with the pendent epoxy functionality.

The monoethylenically unsaturated hydroxy functional monomers useful in preparation of the copolymer and providing the hydroxy functionality to the copolymer may be selected from a long list of hydroxy functional monomers. Preferably, however, the hydroxy functional monomers are acrylates and may be selected from the group consisting of, but not limited to, the following esters of acrylic or methacrylic acids and aliphatic alcohols: 2-hydroxyethyl acrylate; 3-chloro-2-hydroxypropyl acrylate; 2-hydroxy-1-methylethyl acrylate; 2-hydroxypropyl acrylate; 3-hydroxypropyl acrylate;, 2,3 dihydroxypropyl acrylate; 2-hydroxy-butyl acrylate; 4-hydroxybutyl acrylate; diethylene-glycol acrylate; 5-hydroxypentyl acrylate 6-hydroxyhexyl acrylate; triethyleneglycol acrylate; 7-hydroxyheptyl acrylate; 2-hydroxyheptyl acrylate; 2-hydroxymethyl methacrylate; 3-chloro-2-hydroxypropyl methacrylate; 2-hydroxy-1-methylethyl methacrylate; 2-hydroxypropyl methacrylate; 3-hydroxypropyl methacrylate; 2,3 dihydroxypropyl methacrylate; 2-hydroxybutyl methacrylate; 4-hydroxybutyl methacrylate; 3,4 dihydroxybutyl methacrylate; 5-hydroxypentyl methacrylate; 6-hydroxyhexyl methacrylate; 1,3-dimethyl-3-hydroxybutyl methacrylate; 5,6 dihydroxyhexyl methacrylate; and 7-hydroxyheptyl methacrylate.

Although one of ordinary skill in the art will recognize that many different hydroxyl bearing monomers, including those listed above could be employed, the preferred hydroxy functional monomers for use in the bifunctional copolymer of the invention are $C_5-C_7$ hydroxy alkyl acrylates and/or $C_5-C_7$ hydroxy alkyl methacrylates, i.e., esters of $C_2-C_3$ dihydric alcohols and acrylic or methacrylic acids.

The remainder of the monomers forming the bifunctional copolymer, i.e., between about 90 and about 70 weight percent of the monomers of the copolymer, are other monoethylenically unsaturated monomers. These monoethylenically unsaturated monomers are preferably alpha-beta olefinically unsaturated monomers, i.e., monomers bearing olefinic unsaturation between the two carbon atoms in the alpha and beta positions with respect to the terminus of an aliphatic carbon-to-carbon chain.

Among the alpha-beta olefinically unsaturated monomers which may be employed are acrylates (meaning esters of either acrylic or methacrylic acids) as well as mixtures of acrylates and vinyl hydrocarbons. Preferably, in excess of 50 weight percent of the total of the copolymer monomers are esters of $C_1-C_{12}$ monohydric alcohols and acrylic or methacrylic acids, e.g., methylmethacrylate, ethylacrylate, butylacrylate, butylmethacrylate, hexylacrylate 2-ethylhexylacrylate, laurylmethacrylate, etc. Among the monovinyl hydrocarbons suitable for use in forming the copolymers are those containing 8 to 12 carbon atoms and including styrene, alpha methylstyrene, vinyl toluene, t-butylstyrene and chlorostyrene. When such monovinyl hydrocarbons are employed, they should constitute less than 50 weight percent of the copolymer. Other monomers such as vinyl chloride, acrylonitrile, ethacrylonitrile, and vinyl acetate may be included in the copolymer as modifying monomers. However, when employed, these modifying monomers should constitute only between about 0 and about 30 weight percent of the monomers in the copolymer.

In preparing the bifunctional copolymer, the epoxy functional monomers, the hydroxy functional monomers and the remaining monoethylenically unsaturated monomers may be mixed and reacted by conventional free radical initiated polymerization in such proportions as to obtain the copolymer desired. At large number of free radical initiators are known to the art and are suitable for the purpose. These include: benzoyl peroxide; lauryl peroxide; t-butylhydroxy peroxide; acetylcyclohexylsulfonyl peroxide diisobutyryl peroxide; di-(2-ethylhexyl) peroxydicarbonate; diisopropylperoxydicarbonate; t-butylperoxypivalate; decanoyl peroxide, azobic (2-methylpropionitrile), etc. The polymerization is preferably carried out in solution using a solvent in which the epoxy functional copolymer is soluble. Included among the suitable solvents are toluene, xylene, dioxane, butanone, etc. If the epoxy functional copolymer is prepared in solution, the solid copolymer can be precipitated by pouring the solution at a slow rate into a nonsolvent for the copolymer such as hexane, octane, or water under suitable agitation conditions.

The bifunctional copolymer useful in the compositions of this invention can also be prepared by emulsion polymerization, suspension polymerization, bulk polymerization, or combinations thereof, or still other suitable methods. In these methods of preparing copolymers, chain transfer agents may be required to control molecular weight of the copolymer to a desired range. When chain transfer agents are used, care must be taken so they do not decrease the shelf stability of the composition by causing premature chemical reactions.

Phosphonic Acid Derivative Catalyst

A second essential component of the coatings of this invention is a reactive catalyst which comprises at least one phosphonic acid derivative having the formula:

wherein n=1 to 2 and R is selected from the group consisting of alkyl, cycloalkyl, or aryl radicals. Preferably, the alkyl, cycloalkyl or aryl radicals contain 1 to 10 carbon atoms. These radicals may be without pendent functionality or they may alternatively bear pendent hydroxyl groups, with mono- or dihydroxy radicals being preferred. Exemplary alkyl, cycloalkyl and aryl groups not bearing pendent functionality are butyl, cyclohexyl, benzyl and phenyl groups.

Most preferred of the groups not bearing additional functionality are primary, straight chain alkyl radicals containing 2 to 6 carbon atoms.

Among the numerous suitable mono- or dihydroxy functional radicals are: 2 hydroxyethyl, 2-ethyl-3-hydroxy-ethyl; 4-methylol-cyclohexylmethyl; 2,2 diethyl-3-hydroxy-propyl; 8-hydroxyoctyl; 6-hydroxyhexyl; 2,2 dimethyl-3-hydroxypropyl; 2-ethyl-2-methyl-3-hydroxypropyl; 7 hydroxyheptyl; 5-hydroxypentyl; 4-methylolbenzyl; 3-hydroxyphenyl; 2,3 -dihydroxypropyl; 5,6 di-hydroxyhexyl; 2-(3-hydroxycyclohexyl)-2-hydroxyethyl; and 2-(3hydroxypentyl)-2-hydroxyethyl.

The above radicals are intended to be only exemplary and numerous other radicals falling within the defined scope of the phosphonic acid derivatives useful in the compositions of invention will be apparent to those skilled in the art.

The phosphonic acid derivative catalysts useful in compositions of the invention may be prepared by addition of phosphonic acid to alkenes, hydrolysis of alkyl or substituted alkyl phosphorus (V) dihalides or corresponding esters or by oxidative phosphonation of hydrocarbons. Such preparation techniques as well as others will be apparent to those skilled in the art.

The phosphonic acid derivatives employed in the compositions of the invention are reactive catalysts which allow the compositions to cure rapidly at low temperature. The acid functionality of the phosphonic acid derivative reacts with the pendent epoxy functionality of the bifunctional copolymer to form an ester and a hydroxyl group. Hydroxyl groups so generated as well as any organic hydroxyl groups which may be included as pendent hydroxyls on the alkyl, cycloalkyl or aryl radical of the phosphonic acid derivative and any optional hydroxy groups included in the composition in the form of hydroxy functional additive crosslink with the amino resin crosslinking agent. It is critical to achieving the desired results of the high solids coating compositions of this invention, i.e., in making them suitable for use as automotive topcoats, that the amount of the phosphonic acid derivative be sufficient to convert substantially all of the epoxy functionality by esterification reaction. Therefore, the phosphonic acid derivative is included in the composition in an amount sufficient to provide between about 0.8 and about 1.4 equivalents, preferably between about 0.9 and about 1.1 equivalents, of acid functionality for each equivalent of pendent epoxy functionality on the bifunctional copolymer. As will be noted from the equivalent amounts of epoxy and phosphonic acid derivative stated above, the acid functionality need not be in stoichiometric amounts to the epoxy functionality. This is because of the fact that during curing of the high solids coating composition, residual water present in the composition hydrolyzes some of the esterified product back to acid and this esterified product then, in turn, reacts with additional epoxy functionality.

Amino Resin Crosslinking Agent

A third essential component of the paint compositions of this invention is an amino resin crosslinking agent. Amino resin crosslinking agents suitable for crosslinking hydroxy functional bearing materials are well known in the art. Typically, these crosslinking materials are products of reactions of melamine, or urea with formaldehyde and various alcohols containing up to and including 4 carbon atoms. Preferably, the amine-aldehyde crosslinking agents useful in this invention are condensation products of formaldehyde with melamine, substituted melamine, urea, benzoguanamine or substituted benzoguanamine. Preferred members of this class are methylated melamine-formaldehyde resins such as hexamethoxymethylmelamine. These liquid crosslinking agents have substantially 100% nonvolatile content as measured by the foil method at 45° C. for 45 minutes. For the purposes of the invention it should be recognized that it is important not to introduce extraneous diluents that would lower the final solids content of the coating.

Particularly preferred crosslinking agents are the amino resins sold by American Cyanamid under the trademark "Cymel". In particular, Cymel 301, Cymel 303 and Cymel 1156, which are alkylated melamine-formaldehyde resins, are useful in the compositions of the invention by reacting with hydroxy functionality included in the composition (i) as an organic hydroxyl group on the phosphonic acid derivative in those cases where pendent hydroxyl functionality is present on the alkyl, cycloalkyl or aryl radical of the phosphonic acid derivative, (ii) as hydroxy functionality on the bifunctional copolymer, (iii) as hydroxy functionality on the optional hydroxy functional additive, or (iv) as a result of esterification of the pendent epoxy functionality on the bifunctional copolymer.

In order to achieve the outstanding properties which make these coating compositions particularly useful as automotive topcoat materials, it is essential that the amount of amino crosslinking agent be sufficient to substantially completely crosslink the hydroxy functionality in the coating composition. Therefore, the amino resin crosslinking agent should be included in the composition in an amount sufficient to provide at least about 0.4 equivalents, preferably between about 0.6 and about 2.1 equivalents, of nitrogen crosslinking functionality for each equivalent of hydroxy functionality included in the composition as discussed above.

Optional Hydroxy Functional Additive

Additional hydroxy functionality other than that achieved by esterification of pendent epoxy functionality of the bifunctional copolymer may be achieved by adding a hydroxy functional additive in amounts up to about 45 weight percent based on the total of the three above discussed components and the hydroxy functional additive itself. Such a material serves to provide additional hydroxy functionality so as to provide a more intimate crosslinked structure in the final cured product. The hydroxy functional additives useful in the composition are preferably selected from various polyols having a number average molecular weight ($M_n$) of between about 150 and about 6000, preferably between about 400 and about 2500. As used herein the term polyol means a compound having two or more hydroxyl groups.

The polyols useful for the invention preferably are selected from the group consisting of: (i) hydroxy functional polyesters; (ii) hydroxy functional polyethers; (iii) hydroxy functional oligoesters, (iv) monomeric polyols, (v) hydroxy functional copolymers produced by free radical polymerization of monoethylenically unsaturated monomers, one of which bears hydroxy functionality and which is included in the copolymer in an amount ranging from about 2.5 to about 30 weight percent of the copolymer and (vi) mixtures of (i)–(v).

The hydroxy functional polyesters useful in the invention are preferably fully saturated products prepared from aliphatic dibasic acids containing 2–20 carbon atoms, such as succinic acid, glutaric acid, adipic acid, azelaic acid, etc., and short chain glycols of up to and including 21 carbon atoms, such as ethylene glycol, 1,2-propylene glycol, 1,3-propylene glycol, 1,2-butylene glycol, 1,3-butylene glycol, 1,4-butylene glycol, neopentyl glycol, 1,4-cyclohexane dimethylol, 1,6-hexamethylene glycol and 2-ethyl-2-methyl-1,3 propane diol. The molecular weight of these materials ranges from about 200 to about 2500 and the hydroxyl number ranges from about 30 to about 230. The hydroxyl number is defined as the number of milligrams of potassium hydroxide needed for each gram of sample to neutralize the acetic acid generated during the reaction between the polyol and excess acetic anhydride. The polyester polyols utilized in the invention are low melting, soft waxy solids which are easily maintained in the molten state.

Among preferred polyesters are products derived from the esterification of ethylene glycol and 1,4 butane diol with adipic acid, ethylene glycol and 1,2 propylene glycol with adipic acid, azelaic acid and sebacic acid copolyester diols, and mixtures thereof.

Among useful polyether diols are polytetramethylene ether glycol, polyethylene glycol, polypropylene glycol and the like.

The hydroxy functional oligoesters useful as hydroxy functional additives in the compositions of the invention are oligoesters preferably having a molecular weight of between about 150 and about 3000. Such oligoesters may be selected from the group consisting of: (i) oligoesters prepared by reacting a dicarboxylic acid with a monoepoxide such as an alkylene oxide; (ii) oligoesters prepared by reacting a polyepoxide with a monocarboxylic acid; and (iii) oligoesters prepared by reacting a hydroxy functional monocarboxylic acid with either a mono- or polyepoxide.

The oligoester prepared by reacting a dicarboxylic acid with an alkylene oxide is a low molecule weight adduct which has a narrow molecular weight distribution when compared to similar compositions made by normal polyester manufacturing techniques. The adduct is prepared by reacting a dibasic carboxylic acid with alkylene oxides, preferably ethylene oxide or propylene oxide, in the presence of a catalyst. Preferred dicarboxylic acids are $C_6$–$C_{12}$ aliphatic acids such as adipic acid, azelaic acid, sebacic acid or dodecane dicarboxylic acid. Mixtures of these acids or mixtures of the aliphatic dicarboxylic acids with aromatic dicarboxylic acids also yield suitable hydroxy functional oligoesters.

The preparation of oligoesters from monocarboxylic acids and polyepoxides is well known and is described, for example, in U.S. Pat. Nos. 2,456,408 and 2,653,141. Numerous hydroxy functional oligoesters within this general category will be apparent to those skilled in the art.

The third type of hydroxy functional oligoesters, i.e., those prepared by reaction of a hydroxy functional monocarboxylic acid with an epoxide is described in U.S. Pat. No. 3,404,018. While the epoxides employed in accordance with the teachings of that patent are polyepoxides, oligoesters may be prepared in a similar manner to that described therein by employing a monoepoxide, such as an alkylene oxide, and a hydroxy functional monocarboxylic acid as described therein. Numerous monoepoxide materials suitable for this purpose will be apparent to those skilled in the art.

Among the numerous monomeric polyols which may be employed as the hydroxy functional additive are the various short chain glycols of up to and including 21 carbon atoms which are useful in preparing a hydroxy functional polyesters discussed above. Other conventional polyhydric alcohols such as glycerols and suger alcohols are also among the numerous monomeric polyols which will be apparent to those skilled in the art.

The hydroxyl bearing copolymer useful as the hydroxy functional additive may be formed from monoethylenically unsaturated monomers, with between about 2.5 and 30 weight percent bearing hydroxy functionality.

The suitable hydroxy functional monomers for preparation of the hydroxy functional resins useful in the invention are the same as those useful in preparation of the bifunctional copolymer discussed above.

The remainder of the monomers forming the hydroxy functional copolymer, i.e., between about 90 and about 70 weight percent, are other monoethylenically unsaturated monomers. These monoethylenically unsaturated monomers, as was the case with respect to the bifunctional copolymer discussed above, are preferably alpha-beta olefinically unsaturated monomers. As was also the case with respect to the bifunctional copolymer, the preferred alpha-beta olefinically unsaturated monomers are acrylates and preferably are employed in excess of 50 weight percent of the total copolymer. Preferred acrylate monomers are esters of $C_1$–$C_{12}$ monohydric alcohols and acrylic or methacrylic acids. Monovinyl hydrocarbons and other modifying monomers may also be employed in the same proportion as they are employed in the bifunctional copolymer discussed above.

Other Materials

In addition to the above discussed components, other materials may be included in the coating compositions of the invention. These include materials such as catalysts, antioxidants, U.V. absorbers, solvents, surface modifiers and wetting agents as well as pigments. The solvents used in the coating compositions of the invention are those which are commonly used. Typical solvents useful in the coating compositions facilitate spray application at high solids content and include toluene, xylene, methyethyl, ketone, acetone, 2-ethoxy-1-ethanol, 2-butoxy-1-ethanol, diacetone alcohol, tetrahydrofuran, ethylacetate, dimethylsuccinate, dimethylglutarate, dimethyladipate or mixtures thereof. The solvent in which the bifunctional copolymer of the coating composition is prepared, may be employed as the solvent for the coating composition thus eliminating the need for drying the bifunctional copolymer after preparation if such is desired. As mentioned above, the nonvolatile solids content of the high solids coating composition may be greater than 55 percent and preferably 70 percent or more, thus limiting the amount of solvent included in the composition.

Surface modifiers or wetting agents are common additives for liquid paint compositions. The exact mode of operation of these surface modifiers is not known, but it is thought that their presence contributes to better adhesion of the coating composition to the surface being coated and helps formation of thin coatings on surfaces, particularly metal surfaces. These surface modifiers are exemplified by acrylic polymers containing 0.1–10 percent by weight of a copolymerized monoethylenically unsaturated carboxylic acid such as methacrylic acid, acrylic or itaconic acid, cellulose acetate butyrate, silicon oils or mixtures thereof. Of course, the choice of surface modifier or wetting agent is dependent upon the type of surface to be coated and selection of the same is clearly within the skill of the artisan.

The high solids coating composition of the invention also may include pigments. As noted above, the high solids composition of this invention are particularly useful when the coating composition includes metallic flake as a pigment. The rapid set and curing of the composition eliminates problems associated with redistribution of the metallic flake in the composition. The amount of pigment in the high solids coating composition may vary, but preferably is between 3 and about 45 weight percent based on the total weight of the paint composition. If the pigment is metallic flake, the amount ranges from about 1 to about 7 weight percent.

Application Techniques

The coating composition can be applied by conventional methods known to those in the art. These methods include roller coating, spray coating, dipping or brushing and, of course, the particular application technique chosen will depend on the particular substrate to be coated and the environment in which the coating operation is to take place.

A particularly preferred technique for applying the high solid coating compositions, particularly when applying the same to automobiles as topcoats, is spray coating through the nozzle of a spray gun.

The invention will be further understood by referring to the following detailed examples. It should be understood that the specific examples are presented by way of illustration and not by way of limitation. Unless otherwise specified, any references to "parts" is intended to mean parts by weight.

EXAMPLE 1

In a three-necked, two liter round bottom flask, equipped with a stirrer, a condenser and a dropping funnel, 750 ml of toluene is brought to reflux under nitrogen. The following mixture of monomers, containing 15 grams of 2,2-azobis-(2-methylpropionate) dissolved in 50 ml acetone, is added dropwise to the refluxing toluene:

|  | Wt. g | Wt. % |
|---|---|---|
| Butyl methacrylate | 150 | 50 |
| Glycidyl methacrylate | 45 | 15 |
| Hydroxypropyl methacrylate | 30 | 10 |
| Methyl methacrylate | 60 | 20 |
| Styrene | 15 | 5 |

The addition of initiator and monomer solution is completed in three hours. The reaction mixture is refluxed for half an hour more and then a 10 ml acetone solution of two grams of the above initiator is added dropwise and the reaction mixture is refluxed for half an hour. Part of the solvent is distilled out to bring the solids content to 66%.

Sixty-five (65) parts of the above polymer solution are mixed with 18 parts of hexamethoxymethyl melamine (Cymel 301) and 14 parts of n-butyl acetate. A solution of 3.2 parts of butyl phosphonic acid in 4 parts of butanol is added to the above solution and the resulting fomulation is applied to steel test panels by spraying. The panels are baked at 125° C. for 18 minutes to obtain coating with excellent hardness, adhesion and solvent (xylene and methyl ethyl ketone) resistance.

EXAMPLE 2

Twenty (20) parts of the copolymer described in Example 1, 12 parts of hexamethoxymethyl melamine (Cymel 301) and 14 parts of polyester Desmophen KL5-2330 (Mobay Chem. Co.) are dissolved in 13 parts of butyl acetate. A solution of one part of butyl sulfonic acid in three parts of butanol is added to the above solution and the resulting formulation is drawn on steel test panels which are baked at 115° C. for 20 minutes to obtain glossy (91/20°) coatings with excellent hardness, adhesion and solvent (xylene and methyl ethyl ketone) resistance.

EXAMPLE 3

A copolymer is prepared by following the procedure described in Example 1 in methyl amyl ketone at 125° C. using the following monomers:

|  | Wt. % |
| --- | --- |
| Butyl methacrylate | 50 |
| Ethylhexyl acrylate | 10 |
| Glycidyl methacrylate | 15 |
| Hydroxypropyl methacrylate | 10 |
| Methyl methacrylate | 10 |
| Styrene | 5 | t-butyl peroctoate (5.25% of monomers) is used as an initiator and determined solids content of the composition is 66.6% by weight. The calculated Tg of the copolymer is 25° C. and the molecular weight from Gel Permeation Chromatography is found to be $\overline{M}_n = 4220$ and $\overline{M}_w/\overline{M}_n = 1.90$.

A mill base is prepared by dispersing titanium dioxide in the polymer with a high speed Cowl's blade. The composition of the millbase is: 15% polymer (100% nonvolatiles), 65% titanium dioxide and 20% methyl amyl ketone.

Seventy-five (75) parts of this millbase, 32 parts of the polymer, 12 parts of bis-(hydroxypropyl) azelate, 30 parts of Cymel 301 and 23 parts of methyl amyl ketone are mixed in a plastic bottle. A solution of 3 parts of benzyl phosphonic acid in 5 parts of isopropanol is added to the above mixture and the resulting formulation is applied by spraying to primed steel test panels. The panels are baked at 130° C. for 18 minutes to obtain hard, glossy coating with excellent adhesion and solvent (xylene and methyl ethyl ketone) resistance.

EXAMPLE 4

By following the procedure descrivbed in Example 3, a copolymer is prepared from the following monomers:

|  | Wt. % |
| --- | --- |
| Butyl methacrylate | 60 |
| Glycidyl methacrylate | 20 |
| Hydroxyethyl acrylate | 10 |
| Styrene | 10 |

The calculated Tg of the polymer is 25° C. and solids content is found to be 54.9% by weight. The molecular weight by Gel Permeation Chromatography is found to be $\overline{M}_n = 1809$ and $\overline{MW}/\overline{M}_n = 2.44$.

(b) As described in Example 3, a millbase is prepared from the following materials:

| Copolymer (a) | 21% (100% nonvolatile) |
| --- | --- |
| Titanium dioxide | 61% |
| Methyl amyl ketone | 18% |

Sixty-two (62) parts of this millbase, 25 parts of the polymer solution, 11 parts of bis-(hydroxypropyl) azelate, 31 parts of hexabutoxymethyl melamine (Cymel 1156), and 21 parts of methyl amyl ketone are taken up in a plastic bottle. A solution of 3.05 parts of phenyl phosphonic acid in 5 parts of butanol is added to the above mixture and the resulting formulation is applied to primed steel panels by spraying. The panels are baked at 130° C. for 18 minutes to obtain coatings with excellent physical properties.

EXAMPLE 5

By following the precedure described in Example 1 a copolymer is prepared from the following monomers:

|  | Wt. % |
| --- | --- |
| Butyl methacrylate | 49 |
| Glycidyl methacrylate | 20 |
| Hydroxypropyl methacrylate | 10 |
| Methyl methacrylate | 16 |
| Styrene | 5 |

The calculated Tg of the copolymer is 43° C. and solids content is found to be 52%. The molecular weight, by Gel Permeation Chromatography, is found to be $\overline{M}_n = 2906$ and $\overline{M}_w/\overline{M}_n = 2.31$.

As described in Example 3, a millbase is prepared with the following composition:

|  | % by Weight |
| --- | --- |
| Titanium dioxide | 65 |
| The above copolymer | 13 (100% nonvolatile) |
| Methyl amyl ketone | 22 |

Sixty-nine (69) parts of this millbase, 37 parts of the polymer, 17.5 parts bis-(hydroxypropyl) azelate, 31 parts ethoxymethoxymethyl benzoguanamine (Cymel 1123, American Cyanamid) and 22 parts of butyl acetate are taken up in a plastic bottle. A solution of 3.25 parts of cyclohexyl phosphonic acid in 5 parts of isopropanol is added to the above mixture and the resulting formulation is applied to primed steel test panels by spraying. The panels are baked at 125° C. for 20 minutes to obtain hard, glossy coating with excellent solvent (xylene and methyl ethyl ketone) resistance.

EXAMPLE 6

By following the procedure described in Example 1, a copolymer is prepared in refluxing methyl amyl ketone from the following monomers:

|  | Wt. % |
| --- | --- |
| Glycidyl methacrylate | 20 |
| Hydroxyethyl acrylate | 10 |
| Butyl methacrylate | 60 |
| Styrene | 10 |

Two percent (2%) t-butyl peroctoate is used as an initiator. The solids content is found to be 53.6%. From Gel Permeation Chromatography the molecular weight of the polymer is found to be: $\overline{M}_n = 2746$ and $\overline{Mw}/\overline{M}_n = 2.33$.

As described in Example 3, a millbase is prepared with the following ingredients:

|  | Wt. % |
| --- | --- |
| Titanium dioxide | 56 |
| The above Polymer | 26 (100% nonvolatile) |
| Methyl amyl ketone | 18 |

Seventy-two (72) parts of this millbase, 15 parts of the polymer, 12 parts of bis-(hydroxypropyl) azelate, 32 parts butoxymethyl glycoluril (Cymel 1170) and 22 parts of methyl amyl ketone are taken up in a plastic bottle. A solution of 2.98 parts of phenyl phosphonic acid in 4 parts of butanol is added to the above mixture and the resulting formulation is applied by spraying to primed steel panels. The panels are baked at 130° C. for 15 minutes to obtain coatings with excellent hardness, adhesion and solvent (xylene and methyl ethyl ketone) resistance.

EXAMPLE 7

By following the precedure described in Example 1, a copolymer is prepared in refluxing toluene from the following monomers:

|  | Wt. % |
|---|---|
| Butyl methacrylate | 50 |
| Ethylhexyl acrylate | 20 |
| Glycidyl methacrylate | 15 |
| Hydroxypropyl methacrylate | 10 |
| Styrene | 5 |

One thousand grams of the total monomers, 700 ml of toluene and 50 grams t-butyl peroctoate are used. The calculated Tg of this polymer is 6° C. and solids content is found to be 59% by weight; Gel Permeation Chromatography shows its molecular weight to be $\overline{M}_n = 4337$ and $\overline{M}w/\overline{M}_n = 2.14$. Viscosity of this polymer solution is 1.33 Stokes.

Fifty parts of the above polymer solution, 5 parts of bis-(hydroxypropyl) adipate and 29 parts of butoxymethyl urea resin (Beetle 80, American Cyanamid) are dissolved in 12 parts of n-butyl acetate. Five parts of a 50% isopropanol solution of phenyl phosphonic acid is added to the above mixture and the resulting formulation is applied by spraying to primed steel panels. The panels are baked at 125° C. for 18 minutes to obtain coatings with excellent hardness, adhesion, gloss and solvent resistance.

EXAMPLE 8

A hydroxy acrylic copolymer is prepared from the following monomers:

|  | Wt. Grams | Wt. % |
|---|---|---|
| Butyl methacrylate | 1000 | 50 |
| Hydroxyethyl acrylate | 400 | 20 |
| Methyl methacrylate | 400 | 20 |
| Styrene | 200 | 10 |

One hundred (100) grams T-butyl perbenzoate is added to the above monomer mixture and the resulting solution is added dropwise over a period of two hours to 1400 grams of refluxing methyl amyl ketone under nitrogen. The heating and stirring is continued for half an hour after the addition is complete and then five grams of t-butyl perbenzoate are added portionwise to the reaction mixture. The reaction mixture is refluxed for an additional ninety minutes and then allowed to cool to room temperature. The molecular weight is determined by Gel Permeation Chromatography to be $\overline{M}_n = 2540$ and $\overline{M}w/\overline{M}_n = 1.94$.

Fifty (50) parts of the above hydroxy polymer solution, 50 parts of the polymer solution from Example 1 and 33 parts of hexamethoxymethyl melamine (Cymel 301) are dissolved in 25 parts of butyl acetate. A solution of 2.7 parts of phenyl phosphonic acid in 4 parts of butanol was added to the above solution and the resulting formulation is applied by spraying to primed steel panels. The panels are baked at 130° C. for 20 minutes to obtain hard, glossy coatings with excellent adhesion and solvent (xylene and methyl ethyl ketone) resistance.

EXAMPLE 9

By following the procedure described in Example 3, a copolymer is prepared from the following monomers:

|  | Wt. % |
|---|---|
| Butyl methacrylate | 40 |
| Glycidyl acrylate | 20 |
| Hydroxypropyl methacrylate | 10 |
| Methyl methacrylate | 20 |
| Styrene | 10 |

The solids content in methyl amyl ketone is determined to be 55% by weight.

Fifty-five (55) parts of this polymer solution and 14 parts of hexamethoxymethyl melamine (Cymel 301) are dissolved in 8 parts of butyl acetate and a solution of 1.9 parts of butyl phosphonic acid in 3 parts of butanol is added to it. The resulting formulation is applied by spraying to primed steel panels which are baked at 130° C. for 20 minutes to obtain coatings with excellent hardness, adhesion and solvent resistance.

EXAMPLE 10

By following the procedure described in Example 1, a copolymer is prepared from the following monomers:

|  | Wt. % |
|---|---|
| Allyl glycidyl ether | 10 |
| Butyl methacrylate | 30 |
| Hydroxypropyl methacrylate | 15 |
| Methyl methacrylate | 25 |
| Styrene | 20 |

Toluene is distilled out to bring the solids level to 59% by weight.

Eighty (80) parts of the above polymer, eleven parts of caprolactone based hydroxy ester PCP 0300 (Union Carbide) and 24 parts of hexamethoxymethyl melamine (Cymel 301) are dissolved in 18 parts of butyl acetate. Phenyl phosphonic acid (3.3 parts) is dissolved in 5 parts of butanol and is added to the above solution. The resulting formulation is applied by spraying to primed steel panels which are baked at 130° C. for 20 minutes to obtain hard, glossy coatings with excellent adhesion and solvent (xylene and methyl ethyl ketone) resistance.

EXAMPLE 11

Ninety (90) parts of the polymer solution from Example 1 are mixed with 12 parts of aluminum flakes (65% in naphtha) and well dispersed with a camel hair brush. Twenty (20) parts of butyl acetate is added to the above mixture and filtered through a coarse cloth. Thirty (30) parts of hexamethoxy methyl melamine (Cymel 301) and five parts of bis-(hydroxypropyl) azelate are added to the above mixture and it is stirred well. A solution of 4.9 parts of phenyl phosphonic acid in 5 parts of butanol is added to the above solution and the resulting formulation is applied by spraying to primed steel panels in three coats. The intermediate flash time is one minute and the final flash is five minutes. The panels are baked at 125° C. for 20 minutes to obtain a silver metallic coating with excellent physical properties.

EXAMPLE 12

Four (4) parts of 1,4-cyclohexanedimethanol and two parts of hexamethoxymethyl melamine (Cymel 301) are added to the formulation described in Example 1. The resulting formulation is drawn on primed steel panels; the panels are baked at 120° C. for 20 minutes to obtain hard, glossy coatings with excellent adhesion and solvent (xylene and methyl ethyl ketone) resistance.

EXAMPLE 13

Eight (8) parts 2-ethyl-1,3-hexanediol and three (3) parts of hexamethoxymethyl melamine (Cymel 301) are added to the formulation described in Example 3 and the resulting formulation is spray applied to primed steel test panels. The panels are baked at 125° C. for 20 minutes to obtain coatings with excellent physical properties.

EXAMPLE 14

Three (3) parts of polypropylene glycol (Pluracol P710, BASF Wyndotte Co.) and one (1) part of hexamethoxymethyl melamine (Cymel 301) are added to the formulation described in Example 1. The resulting paint composition is drawn on primed steel panels and the panels are baked at 125° C. for 20 minutes to obtain coatings with excellent physical properties.

EXAMPLE 15

Three hundred fifty (350) grams of titanium dioxide are mixed with three hundred fifty (350) parts of Acryloid OL-42 (Rohm and Haas Chem. Co.) and twenty-five (25) parts of butyl acetate. The above mixture is taken up in a porcelain bottle containing porcelain beads and put on a roller mill for 16 hours. Thirty-two (32) parts of this millbase are mixed with ten (10) parts of bis-(hydroxypropyl) azelate, thirty (30) parts of polymer solution from Example 1, twenty-five (25) parts of hexamethoxymethyl melamine (Cymel 301) and twenty (20) parts of butyl acetate. Butyl phosphonic acid (1.5 parts) is dissolved in 3 parts of butanol and is added to the above mixture. The resulting formulation is applied by spraying to primed steel panels which are baked at 125° C. for 18 minutes to obtain a white coating with excellent physical properties.

EXAMPLE 16

Fifty-two (52) parts of blue pigment Phthalo Blue are mixed with five hundred (500) parts of Acryloid OL-42 (Rohm and Haas Chem. Co.) and forty-five (45) parts of butyl acetate; the millbase is ground as described in Example 15. Twenty-six (26) parts of this millbase are mixed with forty-five (45) parts of bis-(hydroxypropyl) azelate, twenty-two (22) parts of Cymel 301, five (5) parts of aluminum flakes (65% in naphtha) and eight (8) parts of butyl acetate. Phenylphosphonic acid (2.5 parts) is dissolved in 3 parts of butanol and is added to the above mixture. The resulting formulation is applied by spraying to primed steel panels in four coats with one minute flash time between coats. After five minutes final flash the panels are baked at 125° C. for 20 minutes to obtain a blue metallic coating with excellent hardness, adhesion and solvent resistance.

EXAMPLE 17

A solution of 1.6 parts of propyl-1,3-diphosphonic acid in 4 parts of isopropanol is added to the formulation described in Example 16 instead of the phenyl phosphonic acid solution used therein. The resulting formulation is applied by spraying to primed steel panels in four coats. The panels are baked at 125° C. for 18 minutes to obtain blue metallic coatings with excellent physical properties.

EXAMPLE 18

Sixty parts of the polymer solution described in Example 9 and 15 parts of Cymel 301 are dissolved in 9 parts of butyl acetate; a solution of 1.9 parts of 2-hydroxyethyl phosphonic acid in 4 parts of isopropanol is added to this solution. The resulting formulation is applied by spraying on to primed steel panels which are baked at 125° C. for 20 minutes to obtain coatings with excellent hardness, adhesion and solvent (xylene and methyl ethyl ketone) resistance.

EXAMPLE 19

Seventy-five (75) parts of the polymer solution described in Example 10, 11.5 parts of caprolactone based hydroxy ester PCP 0300 (Union Carbide) and 23 parts of Cymel 301 are dissolved in 15 parts of butyl acetate. A solution of 2.9 parts of 2-hydroxypropyl phosphonic acid in 4 parts of isopropanol is added to the above solution. The resulting formulation is applied by spraying to primed steel panels which are baked at 125° C. for 18 minutes to obtain hard, glossy coatings with excellent adhesion and solvent (xylene and methyl ethyl ketone) resistance.

In view of this disclosure, many modifications of this invention will be apparent to those skilled in the art. It is intended that all such modifications which fall within the true scope of this invention be included within the terms of the appended claims.

What is claimed is:

1. A thermosetting coating composition adapted for low temperature bake applications which, exclusive of pigments, solvents and other nonreactive components, consists essentially of:

(A) a bifunctional copolymer bearing hydroxy functionality and pendent epoxy functionality, having a number average molecular weight ($\overline{M}n$) of between about 1500 and about 10,000 and a glass transition temperature (Tg) of between about −25° C. and about 70° C., said copolymer consisting essentially of (i) between about 5 and about 25 weight percent of monoethylenically unsaturated monomers bearing gylcidyl functionality and between about 5 and about 25 weight percent of monoethylenically unsaturated monomers bearing hydroxy functionality, with the total of said gylcidyl and hydroxy functional monomers being not greater than about 30 weight percent of the monomers in said bifunctional copolymer and (ii) between about 90 and about 70 weight percent of other monoethylenically unsaturated monomers;

(B) A reactive catalyst comprising at least one phosphonic acid derivative having the formula:

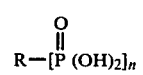

wherein n=1 to 2 and R is selected from the group consisting of alkyl, cycloalkyl and aryl radicals;

(C) an amine-aldehyde resin crosslinking agent; and (D) up to about 45 weight percent based on the total weight of (A), (B), (C), and (D) of a hydroxy functional additive having a number average molecular weight (Mn) of between about 150 and about 6000, said phosphonic acid derivative being included in said composition in an amount sufficient to provide between about 0.8 and about 1.4 equivalents of acid functionality for each equivalent of pendent epoxy functionality on said bifunctional copolymer, and said amine-aldehyde resin crosslinking agent being included in said composition in an amount sufficient to provide at least about 0.4 equivalents of nitrogen cross-linking functionality for each equivalent of hydroxy functionality included in said composition as a group on an initial component thereof or generated in situ or as a result of esterification of said pendent epoxy functionality of said bifunctional copolymer during cure of said coating composition.

2. A composition in accordance with claim 1, wherein said monoethylenically unsaturated monomers bearing glycidyl functionality in said bifunctional copolymer are selected from glycidyl esters and glycidyl ethers.

3. A composition in accordance with claim 2, wherein said monoethylenically unsaturated monomers bearing glycidyl functionality are selected from glycidyl esters of monoethylenically unsaturated carboxylic acids.

4. A composition in accordance with claim 1 wherein said monoethylenically unsaturated monomers bearing hydroxy functionality in said bifunctional copolymer are selected from the group consisting of hydroxyalkyl acrylates formed by the reaction of $C_2$–$C_5$ dihydric alcohols and acrylic or methacrylic acids.

5. A composition in accordance with claim 1 wherein said other monoethylenically unsaturated monomers in said bifunctional copolymer are selected from the group consisting of acrylates and other monoethylenically unsaturated vinyl monomers.

6. A compsition in accordance with claim 5 wherein said acrylate monomers comprise at least about 50 weight percent of the total monomers in said bifunctional copolymer and are selected from its group consisting of esters of $C_1$–$C_{12}$ monohydric alcohols and acrylic or methacrylic acids.

7. A composition in accordance with claim 1 wherein said reactive catalyst comprises at least one phosphonic acid derivative wherein R is an alkyl, cycloalkyl or aryl radical containing 1 to 10 carbon atoms.

8. A composition in accordance with claim 1 wherein said reactive catalyst comprises at least one phosphonic acid derivative wherein R is an alkyl, cycloalkyl or aryl radical bearing pendent hydroxy functionality.

9. A composition in accordance with claim 8 wherein R is a mono- or dihydroxy alkyl, cycloalkyl or aryl radical.

10. A composition in accordance with claim 1 wherein said reactive catalyst comprises at least one phosponic acid derivative wherein R is an alkyl, cycloalkyl or aryl group which does not bear pendent functionality.

11. A composition in accordance with claim 9 wherein R is a primary straight chain alkyl radical containing 2 to 6 carbon atoms.

12. A composition in accordance with claim 1 wherein said amine-aldehyde resin is selected from the group consisting of condensation products of formaldehyde with melamine, substituted melamine, urea, benzoguanamine and substituted benzoguanamine, and mixtures of said condensation products, and is included in an amount sufficient to provide between about 0.6 and about 2.1 equivalents of nitrogen crosslinking functionality per equivalent of hydroxy functionality.

13. A composition in accordance with claim 1 wherein said hydroxy functional additive is selected from the group consisting of (i) hydroxy functional polyesters, (ii) hydroxy functional polyethers, (iii) hydroxy functional oligoesters, (iv) monomeric polyols; (v) hydroxy functional copolymers formed from monoethylenically unsaturated monomers, one or more of which bears hydroxy functionality and which is included in said copolymer in amounts ranging from about 2.5 to about 30 weight percent of said copolymer, and (vi) mixtures of (i)–(v).

14. A composition in accordance with claim 1 wherein said phosphonic acid derivative catalyst is included in said composition in an amount sufficient to provide between about 0.9 and about 1.1 equivalents of acid functionality for each equivalent of pendent epoxy functionality on said bifunctional copolymer.

15. A composition in accordance with claim 1 wherein said composition contains greater than about 55% by weight of non-volatile solids.

16. A composition in accordance with claim 1 wherein said amine-aldehyde resin crosslinking agent is included in said composition in an amount sufficient to provide between about 0.6 and about 2.1 equivalents of nitrogen crosslinking functionality for each equivalent of hydroxy functionality included in the composition either as (i) an organic hydroxyl group on said phosphonic acid derivative catalyst, (ii) a hydroxyl group on said bifunctional copolymer, (iii) a hydroxyl group on said hydroxy functional additive, or (iv) as a result of esterification of the pendent epoxy functionality of said bifunctional copolymer during cure of said composition.

* * * * *